Figure 1:
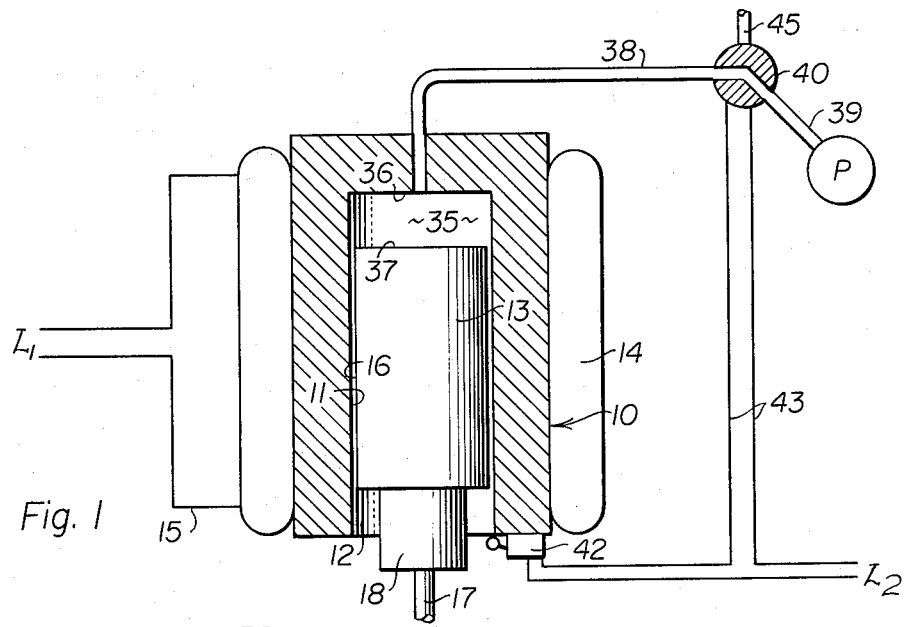

March 17, 1964  E. F. MACKS  3,124,979
TOOL SUPPORT AND DRIVE
Filed Aug. 22, 1960

INVENTOR.
ELMER FRED MACKS
BY
for Watts, Edgerton, Pyle & Disher
Attorneys

United States Patent Office 3,124,979
Patented Mar. 17, 1964

3,124,979
TOOL SUPPORT AND DRIVE
Elmer Fred Macks, Willow Lane, Vermilion, Ohio
Filed Aug. 22, 1960, Ser. No. 50,940
11 Claims. (Cl. 77—33.5)

This invention pertains to tool holders and more particularly to a rotatable and reciprocable tool holder which is especially suited for drilling, grinding, cutting, and similar operations.

In many modern machining operations, quick, high precision feed of a drill or grinder spindle is required. Often good control over the speed of tool rotation is also required. With the present invention a very efficient, practical device which meets both these and other requirements such as very high speed operation is provided.

An elongated, cylindrically contoured, magnetically susceptible, reciprocating-rotating spindle is provided. The spindle is disposed in a cylindrical bore in a spindle housing. The cylindrically contoured surfaces of the housing and spindle are complemental and closely spaced to define a fluid lubricated support region. The bore is longer than the spindle to permit relative reciprocation of the housing and the spindle while the spindle is maintained in spaced relationship while rotating within the bore surface.

The housing carries a winding or other means to produce a magnetic field. The magnetic field is utilized to provide axial location of the spindle relative to the housing. In the preferred arrangement the magnetic field is also used to cause relative rotation of the spindle and housing. One end of the spindle projects from an open end of the bore and the bore near the other end of the spindle is closed. A means is provided to introduce air under pressure into the space between the closed end of the housing and the inner end of the spindle. The air urges the spindle outwardly to provide axial feed during a cutting operation. When the spindle reaches the end of the feed stroke the introduction of fluid under pressure is stopped, and the magnetic field causes the spindle to return to its prefeed position.

Accordingly, one of the principal objects of this invention is to provide a novel and improved simplified feed and radial support means for a rotating tool.

Another object of this invention is the provision of a reciprocating tool spindle that is fully supported radially on a film of air or other gas.

A further object of this invention is to provide a precise and quick acting spindle feed which utilizes a magnetic field for axial location of the spindle and a fluid feed to overcome the locating action of magnetic field.

A related object is to provide a mechanism made in accordance with the preceding object in which the action of the magnetic field on the spindle is utilized to drive the feed fluid out of the chamber between the spindle and the housing during the return stroke of the spindle.

Figure 2:
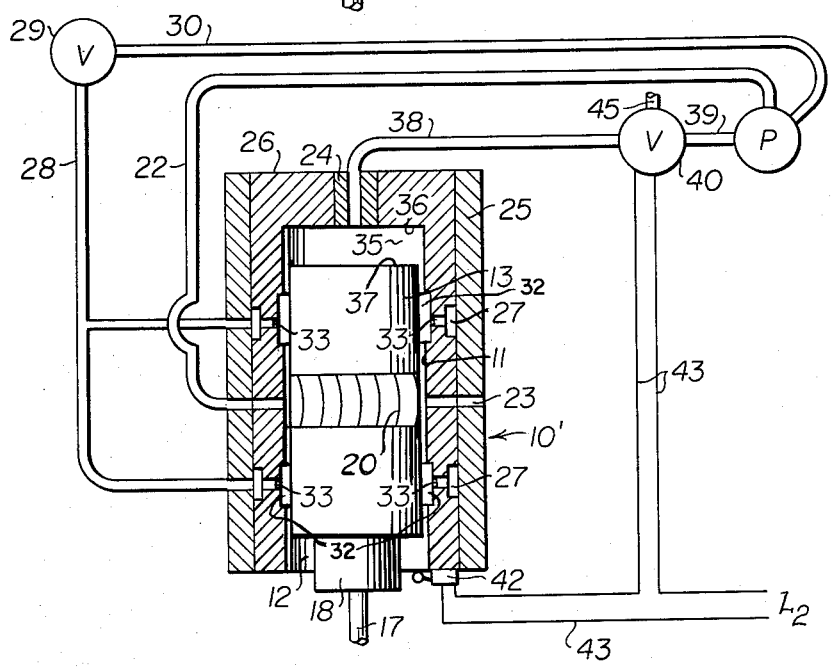

Other objects and a fuller understanding of the invention may be had by referring to the following description and claims, taken in conjunction with the accompanying drawings, in which:

FIGURE 1 is a sectional view of one of spindle and housing made in accordance with the teachings of this invention with feed controls shown schematically and with the spindle and housing formed as the rotor and stator elements of an induction motor to provide the relative rotation of the two; and, FIGURE 2 is a similar view of a slightly modified form of the invention in which relative rotation is obtained by a turbine drive.

Referring now to the drawings, a housing is shown at 10. The housing has a cylindrically contoured surface 11 which defines the walls of a bore 12. A cylindrically contoured spindle 13 is positioned in the bore 12. The spindle 13 is shorter than the surface 11 by an amount that is slightly more than the amount of longitudinal feed desired.

A winding 14 is carried by the housing 10. The winding 14 is connected to a source of electricity L-1 by conductors 15. The winding 14 is provided to induce a magnetic field. The spindle 13 is a magnetic susceptible member that is positioned, axially speaking, by the magnetic field. The winding 14 is the stator winding of an induction motor and the spindle 13 is the armature. In FIGURE 2 a permanent magnet 24 positions the spindle 13 axially, but does not cause it to rotate. It will be recognized that the winding 14 can be used in the FIGURE 2 embodiment to provide solenoid-like electromagnetic axial location. This is in fact the preferred arrangement if a substantial amount of tool feed is required since the construction shown in FIGURE 2 limits the axial travel of the spindle to the effective field of the permanent magnet.

In the preferred embodiment of the invention the surface 11 and the surface of the spindle 13 are smooth complemental surfaces. The surfaces define a load-carrying gas film-producing region therebetween. The surfaces produce, upon relative rotation, dynamic load-carrying air film therebetween. Since the ambient fluid is air or another gas the radial load-carrying film may be referred to as a pneumodynamic film. The principles of such a film and the advantages of a single load-carrying gas film in a dynamoelectric machine are disclosed in greater detail in application for patent Serial No. 714,454, filed January 28, 1958, under the title Fluid Supported Rotor, now Patent No. 2,983,832, issued May 9, 1961 and other pending applications and patents listed there.

To obtain a pneumodynamic film in this region the surfaces should both be of a smoothness of at least 16 microinch R.M.S. Taper should be limited to 0.0001 inch per inch of length. The out of round should be limited to 0.0001 inch per inch of diameter and the diametral clearance should be from 0.000050 to 0.003 inch per inch of spindle diameter with the upper limit being 0.0005 when the fluid is air.

In vertical operation, particularly at high speed, pneumodynamic bearings are sometimes unstable due to a phenomena known as "whirl." Incipient bearing failure can result due to the lack of boundary lubricating effectiveness in air or gas-bearing system.

Various known methods of suppression of whirl in pneumodynamic gas bearings are known. Several are described in the referenced applications and patents listed in the above noted patent. One means of correction is that of applying pneumostatic pressure such as is shown in FIGURE 2 and will be described in greater detail below.

In the embodiment of FIGURE 2 a turbine drive is provided. The turbine drive affords low cost infinite speed variation within the speed range of the mechanism. A fluid turbine, particularly if the fluid is gas, also affords protection of cutting tool 17 and tool supporting chuck 18. This protection of the drill or other cutting tool 17 and the chuck 18 is obtained because the turbine will slip if the drill jams or strikes some inordinately hard obstacle.

In the embodiment of FIGURE 2, a plurality of turbine blades 20 are formed in the surface of the spindle 13. The blades 20 are disposed within the contour generated by the cylindrical surface 16. Thus, even though the surface 16 is separated into two sections by the blades 20, the surfaces may be formed in a single machining operation and the advantages of unit bearing construction are obtained. The blades are elongated longitudinally so that they will remain in driving alignment with nozzle 21 as the spindle reciprocates in the bore 12.

The nozzle 21 is connected to a source of fluid under pressure by a conduit 22. A turbine fluid outlet passage is provided at 23. In the preferred arrangement, where the turbine fluid is air, the passage 23 may be a vent to the atmosphere. If another fluid is used as the turbine fluid, the passage may be connected to a reservoir.

In FIGURE 2 the housing 10' includes an outer sleeve 25 and an inner body 26. A pair of annular manifolds 27 are formed in the periphery of the body 26. Air under pressure is supplied to the manifolds 27 by conduit 28 which is connected to a control valve 29. The control valve 29 is connected to the source of pressure P by conduit 30. Air under pressure is fed from the manifolds 27 to depressions 32 by orifice compensated passages 33.

The described orifice compensated system is one type of pneumostatic bearing. It will be recognized that other types of pneumostatic systems may be used with both of the disclosed embodiments. It will also be recognized that the radial bearing systems of the two shown embodiments are interchangeable.

One of the outstanding advantages of the invention is obtained through the precision tool feed system at high operating speeds and in limited space envelopes. A space or chamber 35 of varying size is defined by the bore surface 11, bore end wall 36, and inner end 37 of the spindle 13. Conduits 38, 39 connect the source of fluid under pressure P to the chamber 35. A valve 40 is interposed between the conduits 38, 39. The valve may be a metering valve, or, where pressure is controlled by controlling the source P, a simple two-way valve of the type shown. By suitable manual or automatic control of valve 40 the tool may be brought up to the work rapidly and then a constant or varying drilling force applied by controlling the pressure in chamber 35 for a given cutting or drilling cycle.

A limit switch 42 is positioned to be actuated when the spindle has reached the end of its travel. Conductors 43 connect the switch to a source of electric energy L-2 and to the valve 40.

In operation the spindle 13 is caused to rotate, air under pressure is supplied through the conduit 38 to the chamber 35 to drive the spindle in a feed stroke. When the limit switch 42 is actuated the valve 40 is changed to connect the conduit 38 with outlet conduit 45. The magnetic field then returns the spindle to its prefeed position and the spindle forces fluid from the chamber 35 through the conduit 38 to the outlet conduit 45.

The preferred embodiment is with air. However, an inert gas may be used as the ambient or pressurizing fluid for certain special applications. Inasmuch as no conventional lubricant is required even at extreme speeds, the drilling or grinding operations may be done at very high temperatures or under controlled atmospheric conditions including nuclear radiation.

Speeds up to several hundred thousand r.p.m. with precision axial feeds can be achieved by the devices shown in FIGURES 1 and 2.

While the invention has been described with detail, it is believed that it essentially comprises a tool spindle of magnetically susceptible material journaled in a housing and on radial dynamic or pneumostatic fluid bearing means, a magnetic field producing member on the housing to locate the spindle axially along the fluid bearing means and a chamber adjacent the inner end of the spindle into which fluid is selectively introduced to shift the spindle against action of the magnetic field.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A drive mechanism for a drill or the like comprising, a spindle member having a peripheral surface defining at least segments of a cylinder and first and second ends, a spindle support member having a surface defining at least segments of a cylinder and the walls of a bore, said spindle member being disposed at least in part in the bore, said peripheral surface of said spindle member and the walls of said bore being complemental and closely spaced to define a load carrying fluid film forming region therebetween, one of said members being magnetically susceptible, the other of said members including magnetic field producing means generating a magnetic field to position the magnetically susceptible member axially, said support member including a portion closing one end of the bore to define a fluid cavity between the portion and the spindle first end when the spindle is magnetically positioned, fluid means connected to a first one of the members to introduce fluid under pressure to the cavity and drive the spindle axially, said spindle including tool holding means at said second end, said spindle and member including means to cause relative rotation thereof, and means for generating a load-carrying film of ambient fluid in said film forming region for radially supporting said spindle member out of frictional contact with the walls of said bore.

2. A drive mechanism for a drill or the like comprising, a magnetically susceptible spindle having a cylindrically contoured surface and first and second ends, a spindle support member having a cylindrically contoured surface defining the walls of a bore, said spindle being disposed at least in part in the bore, said surface of said spindle member and the walls of said bore being complemental and closely spaced apart to define a load carrying fluid film forming region therebetween, said member including magnetic field producing means generating a magnetic field to position the magnetically susceptible member axially, said member including cap means closing one end of the bore to define a fluid cavity between the cap and the spindle first end when the spindle is magnetically positioned, means connected to the member to introduce fluid under pressure to the cavity and drive the spindle axially, said spindle including tool holding means at said second end, said spindle and member including means to cause relative rotation thereof, and means for generating a load-carrying film of ambient fluid in said film forming region for radially supporting said spindle member out of functional contact with the walls of said bore.

3. A drive mechanism for a drill or the like comprising, a spindle member having a peripheral surface defining at least segments of a cylinder and first and second ends, a spindle support member having a surface defining at least segments of a cylinder and the walls of a bore, said spindle member being disposed at least in part in the bore, said surface of said spindle member and the walls of said bore being complemental and closely spaced to define a load carrying fluid film forming region therebetween, one of said members being magnetically susceptible, the other of said members including magnetic field producing means generating a magnetic field to position the magnetically susceptible member axially, said support member including cap means closing one end of the bore to define a fluid cavity between the cap and the spindle first end when the spindle is magnetically positioned, fluid means connected to a first one of the members to introduce fluid under pressure to the cavity and drive the spindle outwardly, said spindle including tool holding means at said second end, said members being first and second members, turbine blades on the first member and a turbine nozzle on the second member positioned to direct a stream of fluid on the blades for rapidly rotating the spindle member to generate a load-carrying film of ambient fluid in said film forming region for radially supporting a member out of frictional contact with the walls of said bore.

4. A drive mechanism for a drill or the like comprising, a spindle member having a peripheral surface defining at least segments of a cylinder and first and second ends, a spindle support member having a surface defining at least segments of a cylinder and the walls of a bore, said spindle member being disposed at least in part in the bore, said surface of said spindle member and the walls of said bore being complemental and closely spaced to define a load carrying fluid film forming region therebetween, one of said members being magnetically susceptible, the other of said members including magnetic field producing means generating a magnetic field to position the magnetically susceptible member axially, said support member including cap means closing one end of the bore to define a fluid cavity between the cap and the spindle first end when the spindle is magnetically positioned, fluid means connected to a first one of the members to introduce fluid under pressure to the cavity and drive the spindle outwardly, the movement of said spindle member being effective to creat a load-carrying film of ambient fluid in said film forming region for radially supporting said bearing member out of frictional contact with the walls of said bore, said spindle including tool holding means at said second end, said magnetic field producing means being an induction motor winding, and said magnetically susceptible member being an induction motor armature.

5. The device of claim 1 wherein a longitudinal travel sensing means is carried by one of the members and actuated by the other of the members when a longitudinal travel extreme is reached and wherein a control means is connected to the fluid means and to the sensing means to stop the flow of fluid into said cavity when the sensing means is actuated.

6. A drive mechanism for a drill or the like comprising, a magnetically susceptible spindle having a cylindrically contoured surface and first and second ends, a spindle housing having a cylindrically contoured bore open at one end and closed at the other, said spindle being disposed at least in part in the bore, said spindle and housing having cylindrically contoured, complemental and closely spaced surfaces defining a load carrying fluid film region therebetween, a magnetic winding carried by the housing to generate a magnetic field to position the spindle axially, said housing and spindle defining an air cavity between the closed end of the bore and the spindle first end when the spindle is magnetically positioned, means connected to the member to introduce air under pressure to the cavity and drive the spindle outwardly, said spindle including a chuck at said second end, said spindle and housing including means to cause relative rotation thereof, and means for generating a load-carrying film of fluid in said fluid film region for radially supporting said spindle member out of frictional contact with the walls of said bore.

7. A drive mechanism for a drill or the like comprising, a magnetically susceptible spindle having a cylindrically contoured surface and first and second ends, a spindle housing having a cylindrically contoured bore open at one end and closed at the other, said spindle being disposed at least in part in the bore, said spindle and housing having cylindrically contoured, complemental and closely fit surfaces defining a load carrying film forming region therebetween, a magnetic winding carried by the housing to generate a magnetic field to position the spindle axially, said housing and spindle defining an air cavity between the closed end of the bore and the spindle first end when the spindle is magnetically positioned, means connected to the member to introduce air under pressure to the cavity and drive the spindle outwardly, the movement of said spindle member being effective to create a load-carrying film of ambient fluid in said film forming region for radially supporting said spindle member out of frictional contact with the walls of said bore, said spindle including a chuck at said second end, said winding being an induction motor winding, and said spindle being an induction motor armature.

8. The device of claim 6 wherein the rotation means comprises a plurality of circumferentially disposed longitudinally extending turbine blades formed in the spindle intermediate the ends of the cylindrical surface and dividing the surface into two sections and the housing includes a nozzle positioned to direct a stream of gas on the turbine blades.

9. In a mechanism for driving a rotatable cuting tool including means to support the tool, the combination of, a spindle member, a housing member surrounding the spindle and open at one end, said members including closely spaced complemental coacting surfaces defining a fluid radial load carrying bearing, one of the members being magnetically susceptible, the other of the members including means to induce a magnetic field and attract the other member to cause relative axial movement of the two and urge them toward a predetermined axially located position, the spindle member including an end wall spaced from the open end and also spaced from the spindle member, the members being first and second members, means connected to the first member to selectively introduce fluid under pressure to the space between the end wall and the spindle member to shift the spindle member axially outwardly against the action of the magnetic field, and means for rapidly rotating said spindle member to thereby generate a fluid radial load-carrying bearing of ambient fluid for holding said closely spaced complemental surfaces out of frictional contact.

10. The device of claim 1 wherein a longitudinal travel sensing means is carried by one of the members and actuated by the other of the members when a longitudinal travel extreme is reached, and control means connected to the fluid means and to the sensing means to control the flow of fluid which axially positions the spindle.

11. A drive mechanism as set forth in claim 6, wherein said means for generating the load-carrying film of fluid includes means for producing a quantity of said fluid under pressure and means for supplying the fluid so produced to the load carrying fluid film region.

References Cited in the file of this patent

UNITED STATES PATENTS

| 2,433,874 | Varian | Jan. 6, 1948 |
| 2,648,238 | Raney | Aug. 11, 1953 |
| 2,674,098 | Taylor | Apr. 6, 1954 |